(12) United States Patent
Teraoka (10) Patent No.: US 11,428,904 B2
(45) Date of Patent: Aug. 30, 2022

(54) CAMERA LENS INCLUDING FIVE LENSES OF +−+++ REFRACTIVE POWERS

(71) Applicant: AAC Optics Solutions Pte. Ltd., Singapore (SG)

(72) Inventor: Hiroyuki Teraoka, Osaka (JP)

(73) Assignee: AAC Optics Solutions Pte. Ltd., Singapore (SG)

(*) Notice: Subject to any disclaimer, the term of this patent is extended or adjusted under 35 U.S.C. 154(b) by 480 days.

(21) Appl. No.: 16/719,934

(22) Filed: Dec. 18, 2019

(65) Prior Publication Data
US 2020/0241249 A1    Jul. 30, 2020

(30) Foreign Application Priority Data
Jan. 29, 2019    (JP) .............................. JP2019-013107

(51) Int. Cl.
*G02B 13/00*    (2006.01)
*G02B 9/60*    (2006.01)

(52) U.S. Cl.
CPC ........... *G02B 13/0045* (2013.01); *G02B 9/60* (2013.01)

(58) Field of Classification Search
CPC ............................... G02B 13/0045; G02B 9/60
See application file for complete search history.

(56) References Cited

U.S. PATENT DOCUMENTS 5,018,807 A * 5/1991 Shirota .............. G02B 13/0005
359/204.1

* cited by examiner

*Primary Examiner* — Wen Huang
(74) *Attorney, Agent, or Firm* — W&G Law Group (57) ABSTRACT

The present disclosure provides a camera lens which has good optical properties and a narrow angle, and includes five lenses. The camera lens includes, from an object side, a first lens having a positive refractive power, a second lens having a negative refractive power, a third lens having a positive refractive power, a fourth lens having a positive refractive power, and a fifth lens having a positive refractive power. The camera lens satisfies specified relational expressions.

5 Claims, 11 Drawing Sheets

CAMERA LENS INCLUDING FIVE LENSES OF +−+++ REFRACTIVE POWERS

TECHNICAL FIELD

The present disclosure relates to a camera lens, and in particular to a camera lens which is suitable for use in a portable modular camera, a WEB camera or the like using a camera element such as a high-pixel CCD or CMOS, has good optical properties, has a full angle of view (hereinafter, referred to as 2ω) being a narrow angle lower than 20°, and includes five lenses.

BACKGROUND

In recent years, various types of camera devices equipped with a camera element such as a CCD and CMOS and others have been widely used. Along with the development of miniaturization and high performance of camera elements, camera lenses with good optical properties and a narrow angle are needed.

The technology related to the camera lens composed of five lenses with a narrow angle and good optical properties is being developed gradually.

A camera lens constituted of five lenses has been proposed, which includes from an object side: a first lens having a positive refractive power; a second lens having a negative refractive power; a third lens having a positive refractive power; a fourth lens having a negative refractive power; and a fifth lens having a negative refractive power, but 2ω=51.75°, and the narrow angle is not sufficient.

Another camera lens constituted of five lenses has been proposed, which includes from an object side: a first lens having a positive refractive power; a second lens having a negative refractive power; a third lens having a positive refractive power; a fourth lens having a negative refractive power; and a fifth lens having a negative refractive power, but 2ω≥37.00°, and the narrow angle is not sufficient.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

Figure 1:
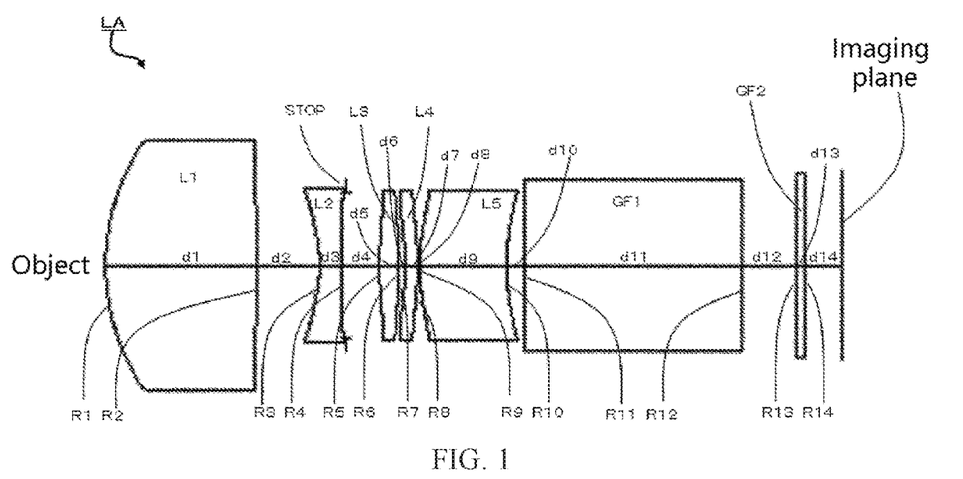
FIG. 1 is a structural diagram of a camera lens LA according to an embodiment of the present disclosure.

An embodiment of a camera lens according to the present disclosure will be described with reference to the drawings. A diagram showing a structure of the camera lens according to the embodiment of the present disclosure is as shown in FIG. 1. The camera lens LA has a five-lens system which includes a first lens L1, a second lens L2, a third lens L3, a fourth lens L4 and a fifth lens L5, which are arranged from an object side towards an image side. Glass plates GF1 and GP2 are provided between the fifth lens L5 and an imaging plane. The glass plates GF1 and GF2 can be glass plates each using a cover glass or having an IR cut-off filter and other functions. In addition, there may be no glass plates GF1 and GF2 provided between the fifth lens L5 and the imaging plane.

The first lens L1 is a lens having a positive refractive power, the second lens L2 is a lens having a negative refractive power, the third lens L3 is a lens having a positive refractive power, the fourth lens L4 is a lens having a positive refractive power, and the fifth Lens L5 is a lens having a positive refractive power. With respect to the lens surfaces of these five lenses, it is preferable to make them be aspheric surfaces in order to satisfactorily correct various aberrations.

The camera lens LA satisfies the following relational expressions (1) to (2):

$$0.25 \leq d1/f \leq 0.30 \quad (1);$$

$$0.01 \leq d3/f \leq 0.04 \quad (2), \text{ and}$$

in which:
f denotes an overall focal length of the lens system,
d1 denotes a center thickness of the first lens, and
d3 denotes a center thickness of the second lens.

The relational expression (1) specifies a ratio of the center thickness d1 of the first lens to the overall focal length f of the lens system. Within the range of the relational expression (1), it is more advantageous to achieve narrow angles with good optical characteristics.

The relational expression (2) specifies a ratio of the center thickness d3 of the second lens L2 to the overall focal length f of the lens system. Within the range of the relational expression (2), it is more advantageous to achieve narrow angles with good optical characteristics.

In the camera lens according to the present embodiment, the first lens L1 is a lens having a positive refractive power, the second lens L2 is a lens having a negative refractive power, and the following relational expression (3) is satisfied:

$$-2.00 \leq f1/f2 \leq -1.45 \quad (3),$$

where
f1 denotes a focal length of the first lens; and
f2 denotes a focal length of the second lens.

The relational expression (3) specifies a ratio of the focal length f1 of the first lens L1 to the focal length f2 of the second lens L2. Within the range of the relational expression (3), it is more advantageous to achieve narrow angles with good optical characteristics.

In the camera lens according to the present embodiment, the first lens L1 is a lens having a positive refractive power, and the following relational expression (4) is satisfied:

$$-0.20 \leq R1/R2 \leq -0.08 \quad (4),$$

where
R1 is a curvature radius of an object side surface of the first lens; and
R2 is a curvature radius of an image side surface of the first lens.

The relational expression (4) specifies a ratio of the curvature radius R1 of the object side surface of the first lens L1 to the curvature radius R2 of the image side surface of the first lens L1. Within the range of the relational expression (4), it is more advantageous to achieve narrow angles with good optical characteristics.

In the camera lens according to the present embodiment, the second lens L2 is a lens having a negative refractive power, and the following relational expression (5) is satisfied:

$$0.10 \leq R3/R4 \leq 0.25 \quad (5),$$

where
R3 is a curvature radius of an object side surface of the second lens; and
R4 is a curvature radius of an image side surface of the second lens.

The relational expression (5) specifies a ratio of the curvature radius R3 of the object side surface of the second lens L2 to the curvature radius R4 of the image side surface of the second lens L2. Within the range of the relational expression (5), it is more advantageous to achieve narrow angles with good optical characteristics.

In the camera lens according to the present embodiment, the third lens L3 is a lens having a negative refractive power, and the following relational expression (6) is satisfied:

$$-0.35 \leq R5/R6 \leq -0.05 \quad (6),$$

where
R5 is a curvature radius of an object side surface of the third lens; and
R6 is a curvature radius of an image side surface of the third lens.

The relational expression (6) specifies a ratio of the curvature radius R5 of the object side surface of the third lens L3 to the curvature radius R6 of the image side surface of the third lens L3. Within the range of the relational expression (6), it is more advantageous to achieve narrow angles with good optical characteristics.

Each of the five lenses constituting the camera lens LA satisfies the structure and relational expression described above, and it is possible to obtain a camera lens which has a narrow angle and good optical properties.

EMBODIMENTS f: the overall focal length of the camera lens LA;
f1: the focal length of the first lens L1;
f2: the focal length of the second lens L2;
f3: the focal length of the third lens L3;
f4: the focal length of the fourth lens L4;
f5: the focal length of the fifth lens L5;
Fno: F-number;
$2\omega$: full angle of view;
STOP: open aperture;
R: the curvature radius of the optical surface, which is the center curvature radius of the lens;
R1: the curvature radius of the object side surface of the first lens L1;
R2: the curvature radius of the image side surface of the first lens L1;
R3: the curvature radius of the object side surface of the second lens L2;
R4: the curvature radius of the image side surface of the second lens L2;
R5: the curvature radius of the object side surface of the third lens L3;
R6: the curvature radius of the image side surface of the third lens L3;
R7: the curvature radius of the object side surface of the fourth lens L4;
R8: the curvature radius of the image side surface of the fourth lens L4;
R9: the curvature radius of the object side surface of the fifth lens L5;
R10: the curvature radius of the image side surface of the fifth lens L5;
R11: the curvature radius of the object side surface of the glass plate GF1;
R12: the curvature radius of the image side surface of the glass plate GF1;
R13: the curvature radius of the object side surface of the glass plate GF2;
R14: the curvature radius of the image side surface of the glass plate GF2;
d: the center thickness of the lens or the distance between the lenses;
d1: the center thickness of the first lens L1;
d2: the axial distance from the image side surface of the first lens L1 to the object side surface of the second lens L2;
d3: the center thickness of the second lens L2;
d4: the axial distance from the image side surface of the second lens L2 to the object side surface of the third lens L3;
d5: the center thickness of the third lens L3;
d6: the axial distance from the image side surface of the third lens L3 to the object side surface of the fourth lens L4;
d7: the center thickness of the fourth lens L4;
d8: the axial distance from the image side surface of the fourth lens L4 to the object side surface of the fifth lens L5;
d9: the center thickness of the fifth lens L5;
d10: the axial distance from the image side surface of the fifth lens L5 to the object side surface of the glass plate GF1;
d11: the center thickness of the glass plate GF1;
d12: the axial distance from the image side surface of the glass plate GF1 to the object side surface of the glass plate GF12;

d13: the center thickness of the glass plate GF2;
d14: the axial distance from the image side surface of the glass plate GF2 to the imaging plane;
nd: the refractive index of line d;
nd1: the refractive index of line d of the first lens L1;
nd2: the refractive index of line d of the second lens L2;
nd3: the refractive index of line d of the third lens L3;
nd4: the refractive index of line d of the fourth lens L4;
nd5: the refractive index of line d of the fifth lens L5;
nd6: the refractive index of line d of the glass plate GF1;
nd7: the refractive index of line d of the glass plate GF2;
v: the Abbe number;
v1: the Abbe number of the first lens L1;
v2: the Abbe number of the second lens L2;
v3: the Abbe number of the third lens L3;
v4: the Abbe number of the fourth lens L4;
v5: the Abbe number of the fifth lens L5;
v6: the Abbe number of the glass plate GF1;
v7: the Abbe number of the glass plate GF2;
TTL: optical length (the axial distance from the object side surface of the first lens L1 to the imaging plane);
LB: the axial distance from the image side surface of the fifth lens L5 to the imaging plane (including thicknesses of the glass plates GF1 and GF2); and
IH: image height.

$$y=(x^2/R)/[1+\{1-(k+1)(x^2/R^2)\}^{1/2}]+A4x^4+A6x^6+A8x^8+A10x^{10}+A12x^{12}+A14x^{14} \quad (7)$$

R is the axial curvature radius, k is the conic coefficient, and A4, A6, A8, A10, A12 and A14 are aspheric coefficients.

For the sake of convenience, the aspheric surface represented by the relational expression (7) is used as an aspheric surface of each of the lenses. However, the present disclosure is not limited to the aspheric surface represented by the relational expression (7).

Embodiment 1

Figure 2:
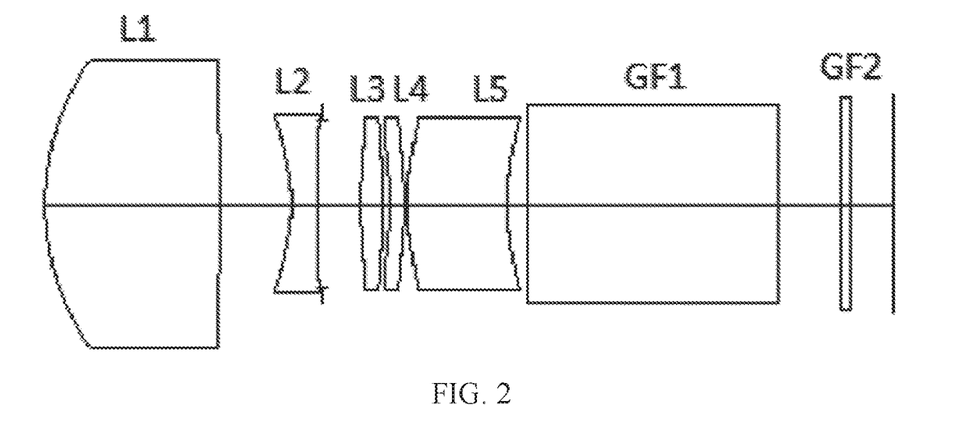
FIG. 2 is a structural diagram of the above-described camera lens LA according to Embodiment 1.

FIG. 2 is a structural diagram of the camera lens LA of Embodiment 1. Each of the first lens L1 to the fifth lens L5 constituting the camera lens LA of Embodiment 1 has a curvature radius R of the object side and image side, a center thickness of the lens or a distance d between the lenses, a refractive index nd and an Abbe number vd as shown in Table 1, a conic coefficient k and an aspheric coefficient as shown in Table 2, and 2ω, Fno, f, f1, f2, f3, f4, f5, TTL and IH as shown in Table 3.

TABLE 1

|  | R (mm) | d (mm) | nd | vd | Effective Radius (mm) |
|---|---|---|---|---|---|
| R1 | 6.0971 | d1 4.192 | nd1 1.5439 | v1 55.95 | 3.488 |
| R2 | −33.8729 | d2 1.726 |  |  | 2.770 |
| R3 | −3.4779 | d3 0.608 | nd2 1.6606 | v2 20.40 | 2.154 |
| R4 | −18.6600 | d4 0.142 |  |  | 2.062 |
| STOP | ∞ | 0.911 |  |  | 2.020 |
| R5 | 19.5727 | d5 0.505 | nd3 1.6606 | v3 20.40 | 2.044 |
| R6 | −150.5595 | d6 0.191 |  |  | 2.050 |
| R7 | −11.6730 | d7 0.354 | nd4 1.6150 | v4 25.92 | 2.049 |
| R8 | −8.5682 | d8 0.050 |  |  | 2.026 |
| R9 | 5.4842 | d9 2.413 | nd5 1.5439 | v5 55.95 | 2.076 |
| R10 | 5.7120 | d10 0.500 |  |  | 2.031 |
| R11 | ∞ | d11 6.000 | nd6 1.7725 | v6 49.60 | 2.052 |
| R12 | ∞ | d12 1.514 |  |  | 2.384 |
| R13 | ∞ | d13 0.210 | nd7 1.5168 | v7 64.17 | 2.534 |
| R14 | ∞ | d14 1.050 |  |  | 2.548 |

TABLE 2

|  | Conic coefficient | Aspheric coefficient | | | | | |
|---|---|---|---|---|---|---|---|
|  | k | A4 | A6 | A8 | A10 | A12 | A14 |
| R1 | 0.0000E+00 | 7.2816E−07 | 4.3222E−06 | −4.5084E−07 | 0.0000E+00 | 0.0000E+00 | 0.0000E+00 |
| R2 | 0.0000E+00 | 1.6177E−03 | −1.4425E−04 | 3.6718E−06 | 0.0000E+00 | 0.0000E+00 | 0.0000E+00 |
| R3 | −1.3727E+01 | 6.8812E−03 | −5.2761E−03 | 1.3593E−03 | −1.7636E−04 | 9.3101E−06 | 0.0000E+00 |
| R4 | 0.0000E+00 | 4.4010E−02 | −2.1327E−02 | 5.8907E−03 | −9.9275E−04 | 9.2575E−05 | −3.7060E−06 |
| R5 | 0.0000E+00 | 1.7661E−02 | −2.9537E−03 | −3.9329E−03 | 1.6534E−03 | −2.4322E−04 | 1.2047E−05 |
| R6 | 0.0000E+00 | −3.0496E−02 | 3.8217E−03 | −2.2730E−03 | 6.5018E−03 | −8.8667E−04 | 4.6794E−05 |
| R7 | 0.0000E+00 | −6.4195E−02 | 7.2619E−02 | −3.3743E−02 | 8.3180E−03 | −1.0623E−03 | 5.4614E−05 |
| R8 | −2.1380E+00 | −2.1982E−02 | 3.1169E−02 | −1.3072E−02 | 2.6964E−03 | −2.9564E−04 | 1.3248E−05 |
| R9 | 3.9513E+00 | −1.1452E−02 | 2.2362E−03 | −1.4785E−03 | 3.9142E−04 | −5.8130E−05 | 3.2430E−06 |
| R10 | 5.0606E+00 | −8.6214E−03 | −9.9414E−04 | 6.4323E−04 | −2.8055E−04 | 5.4493E−05 | −4.8542E−06 |

TABLE 3

| 2ω (°) | 18.00 |
|---|---|
| Fno | 2.50 |
| f (mm) | 16.444 |
| f1 (mm) | 9.865 |
| f2 (mm) | −6.576 |
| f3 (mm) | 26.254 |
| f4 (mm) | 50.200 |
| f5 (mm) | 53.429 |
| TTL (mm) | 20.367 |
| LB (mm) | 9.274 |
| IH (mm) | 2.619 |

Table 16 below shows the numerical values defined in Embodiments 1 to 5 and the numerical values corresponding to the parameters specified by the relational expressions (1) to (6).

As shown in Table 16, Embodiment 1 satisfies the relational expressions (1) to (6).

Figure 3:
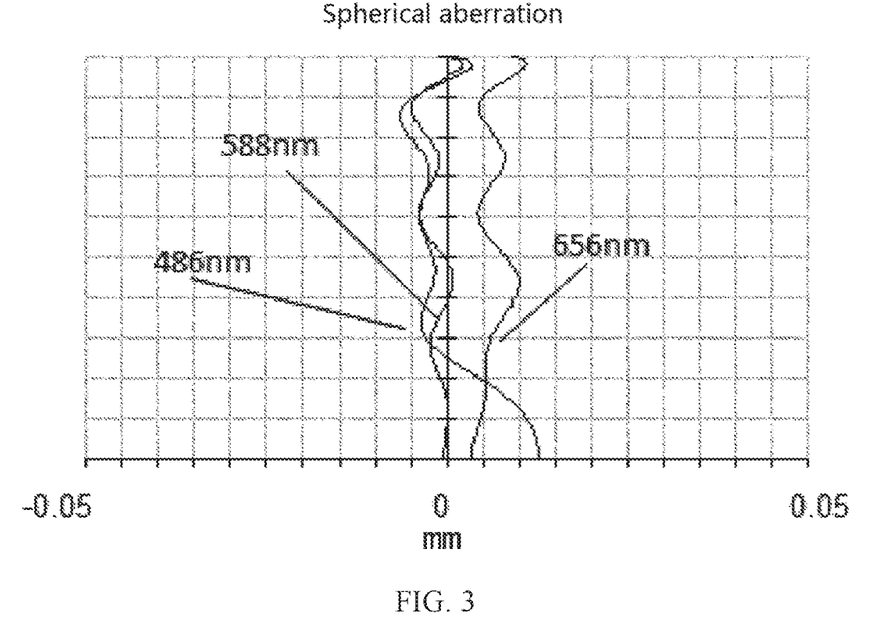
FIG. 3 is a diagram of a spherical aberration of the camera lens LA of Embodiment 1.
Figure 4:
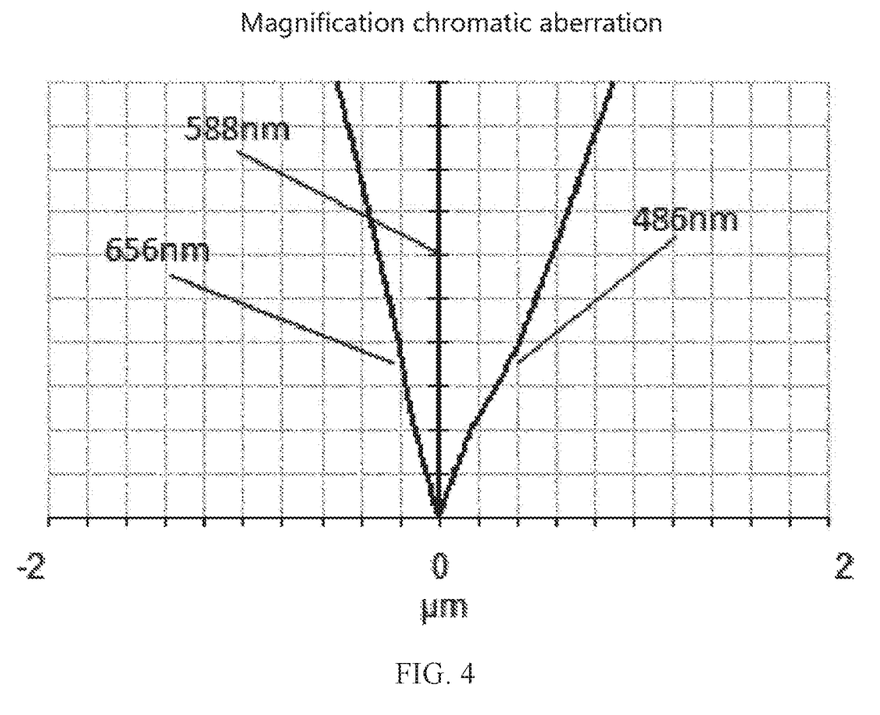
FIG. 4 is a diagram of a magnification chromatic aberration of the camera lens LA of Embodiment 1.
Figure 5:
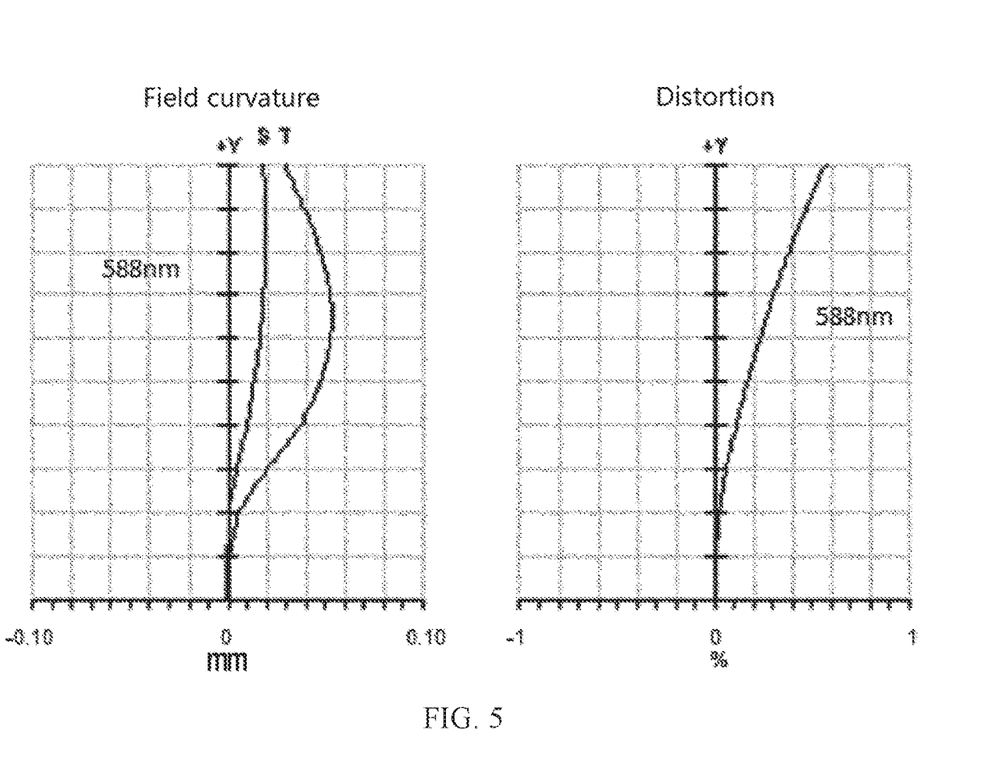
FIG. 5 is a diagram of field curvature and distortion of the camera lens LA of Embodiment 1.

The spherical aberration of the camera lens LA of Embodiment 1 is as shown in FIG. 3, the magnification chromatic aberration of magnification thereof is as shown in FIG. 4, and the field curvature and the distortion are as shown in FIG. 5. Furthermore, the field curvature S in FIG. 5 is the field curvature for the sagittal imaging plane, and T is the field curvature for the meridianal imaging plane, and the same applies to Embodiments 2 to 5. As shown in Table 3, the camera lens LA of Embodiment 1 has a narrow angle. As can be seen from FIGS. 3 to 5, the camera lens LA of Embodiment 1 has good optical properties.

Embodiment 2

Figure 6:
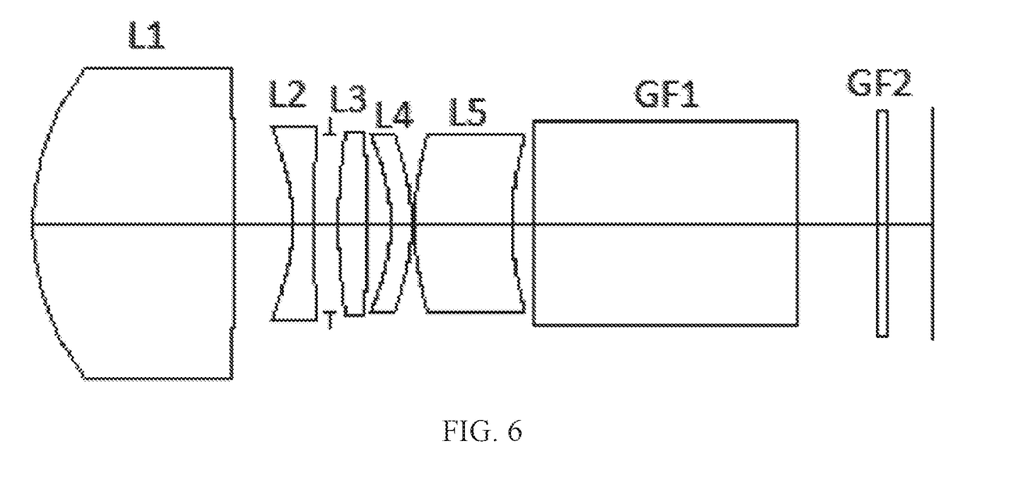
FIG. 6 is a structural diagram of the above-described camera lens LA according to Embodiment 2.

FIG. 6 is a structural diagram of the camera lens LA of Embodiment 2. Each of the first lens L1 to the fifth lens L5 constituting the camera lens LA of Embodiment 2 has a curvature radius R of the object side and image side, a center thickness of the lens or a distance d between the lenses, a refractive index nd and an Abbe number vd as shown in Table 4, a conic coefficient k and an aspheric coefficient as shown in Table 5, and $2\omega$, Fno, f, f1, f2, f3, f4, f5, TTL and IH as shown in Table 6.

TABLE 6

| | |
|---|---|
| $2\omega$ (°) | 18.00 |
| Fno | 2.50 |
| f (mm) | 16.439 |
| f1 (mm) | 10.051 |
| f2 (mm) | −6.569 |
| f3 (mm) | 17.509 |
| f4 (mm) | 98.896 |
| f5 (mm) | 62.996 |
| TTL (mm) | 20.508 |
| LB (mm) | 9.593 |
| IH (mm) | 2.619 |

As shown in Table 16, Embodiment 2 satisfies the relational expressions (1) to (6).

Figure 7:
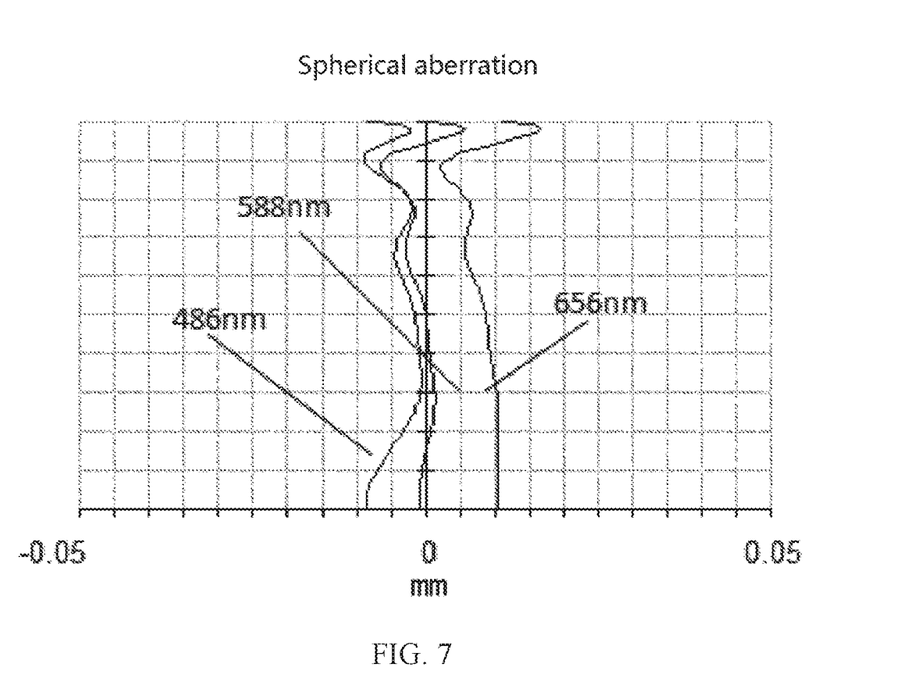
FIG. 7 is a diagram of a spherical aberration of the camera lens LA of Embodiment 2.
Figure 8:
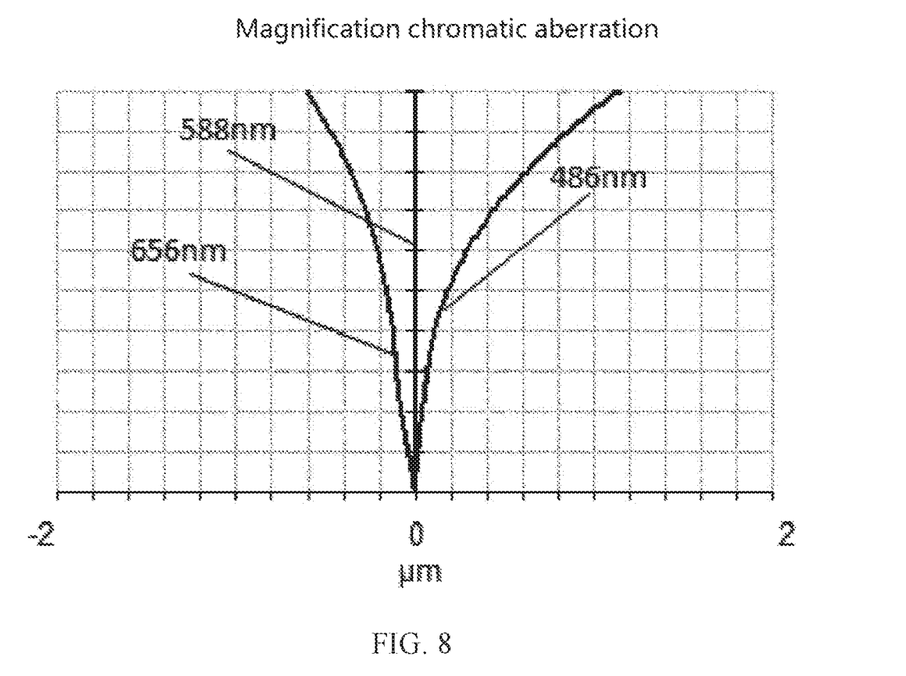
FIG. 8 is a diagram of a magnification chromatic aberration of the camera lens LA of Embodiment 2.
Figure 9:
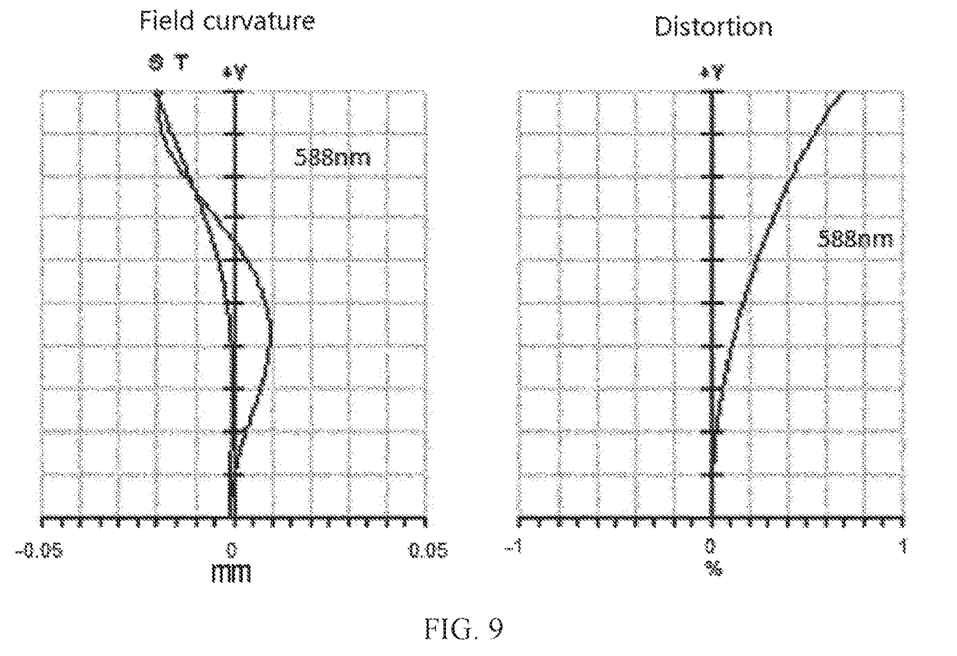
FIG. 9 is a diagram of field curvature and distortion of the camera lens LA of Embodiment 2.

The spherical aberration of the camera lens LA of Embodiment 2 is as shown in FIG. 7, the magnification chromatic aberration of magnification thereof is as shown in FIG. 8, and the field curvature and the distortion are as shown in FIG. 9. As shown in Table 6, the camera lens LA of Embodiment 2 has a narrow angle. As can be seen from FIGS. 7 to 9, the camera lens LA of Embodiment 2 has good optical properties.

Embodiment 3

Figure 10:
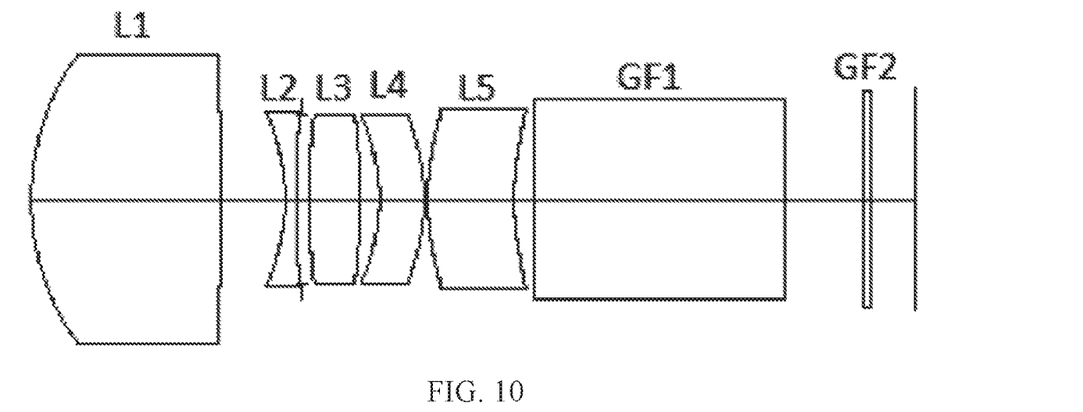
FIG. 10 is a structural diagram of the above-described camera lens LA according to Embodiment 3.

FIG. 10 is a structural diagram of the camera lens LA of Embodiment 3. Each of the first lens L1 to the fifth lens L5 constituting the camera lens LA of Embodiment 1 has a curvature radius R of the object side and image side, a center thickness of the lens or a distance d between the lenses, a refractive index nd and an Abbe number vd as shown in Table 7, a conic coefficient k and an aspheric coefficient as shown in Table 8, and $2\omega$, Fno, f, f1, f2, f3, f4, f5, TTL and IH as shown in Table 9.

TABLE 4

| | R (mm) | d (mm) | nd | | vd | Effective Radius (mm) |
|---|---|---|---|---|---|---|
| R1 | 5.8736 | d1 4.598 | nd1 1.5439 | v1 | 55.95 | 3.558 |
| R2 | −57.1741 | d2 1.330 | | | | 2.642 |
| R3 | −3.4985 | d3 0.488 | nd2 1.6606 | v2 | 20.40 | 2.189 |
| R4 | −19.0674 | d4 0.373 | | | | 2.107 |
| STOP | ∞ | 0.173 | | | | 2.036 |
| R5 | 15.4276 | d5 0.669 | nd3 1.6606 | v3 | 20.40 | 2.066 |
| R6 | −45.3972 | d6 0.515 | | | | 2.029 |
| R7 | −4.3454 | d7 0.487 | nd4 1.6150 | v4 | 25.92 | 2.000 |
| R8 | −4.2288 | d8 0.050 | | | | 2.016 |
| R9 | 5.7136 | d9 2.231 | nd5 1.5439 | v5 | 55.95 | 2.050 |
| R10 | 5.9139 | d10 0.500 | | | | 2.013 |
| R11 | ∞ | d11 6.000 | nd6 1.7725 | v6 | 49.60 | 2.034 |
| R12 | ∞ | d12 1.833 | | | | 2.362 |
| R13 | ∞ | d13 0.210 | nd7 1.5168 | v7 | 64.17 | 2.540 |
| R14 | ∞ | d14 1.050 | | | | 2.553 |

TABLE 7

| | R (mm) | d (mm) | nd | | vd | Effective Radius (mm) |
|---|---|---|---|---|---|---|
| R1 | 5.9599 | d1 4.553 | nd1 1.5439 | v1 | 55.95 | 3.478 |
| R2 | −48.6640 | d2 1.535 | | | | 2.654 |
| R3 | −3.5330 | d3 0.276 | nd2 1.6606 | v2 | 20.40 | 2.100 |
| R4 | −18.8333 | d4 0.137 | | | | 2.055 |
| STOP | ∞ | 0.135 | | | | 2.017 |
| R5 | 18.5184 | d5 1.198 | nd3 1.6606 | v3 | 20.40 | 2.057 |
| R6 | −55.0356 | d6 0.493 | | | | 2.003 |
| R7 | −4.5524 | d7 1.076 | nd4 1.6150 | v4 | 25.92 | 1.984 |
| R8 | −4.2366 | d8 0.081 | | | | 2.056 |
| R9 | 5.7382 | d9 2.068 | nd5 1.5439 | v5 | 55.95 | 2.129 |
| R10 | 5.8046 | d10 0.500 | | | | 2.115 |
| R11 | ∞ | d11 6.000 | nd6 1.7725 | v6 | 49.60 | 2.133 |
| R12 | ∞ | d12 1.841 | | | | 2.406 |
| R13 | ∞ | d13 0.210 | nd7 1.5168 | v7 | 64.17 | 2.555 |
| R14 | ∞ | d14 1.050 | | | | 2.566 |

TABLE 5

| | Conic coefficient | Aspheric coefficient | | | | | |
|---|---|---|---|---|---|---|---|
| | k | A4 | A6 | A8 | A10 | A12 | A14 |
| R1 | 0.0000E+00 | −4.8363E−05 | 7.3906E−06 | −1.0729E−07 | 0.0000E+00 | 0.0000E+00 | 0.0000E+00 |
| R2 | 0.0000E+00 | −3.9287E−04 | 1.7018E−04 | −1.3108E−05 | 0.0000E+00 | 0.0000E+00 | 0.0000E+00 |
| R3 | −1.1254E+01 | 3.7449E−03 | −6.2480E−03 | 2.2916E−03 | −3.6772E−04 | 2.1826E−05 | 0.0000E+00 |
| R4 | 0.0000E+00 | 4.5501E−02 | −2.4999E−02 | 6.9076E−03 | −9.0705E−04 | 3.8104E−05 | 1.0180E−06 |
| R5 | 0.0000E+00 | 2.1143E−02 | −1.2668E−02 | 1.8083E−03 | 3.0569E−04 | −9.2082E−05 | 6.0773E−06 |
| R6 | 0.0000E+00 | −2.7968E−03 | −2.8025E−03 | −1.1845E−04 | 3.7203E−04 | −7.1450E−05 | 4.5193E−06 |
| R7 | 0.0000E+00 | −1.1893E−03 | 6.4305E−03 | −4.4240E−03 | 1.6371E−03 | −3.2134E−04 | 2.4943E−05 |
| R8 | −1.6304E+00 | 1.1861E−02 | −5.5245E−03 | 1.7742E−03 | −1.9042E−04 | −2.3993E−05 | 4.6819E−06 |
| R9 | 5.2707E+00 | 1.4485E−03 | −1.2074E−02 | 6.2051E−03 | −1.7497E−03 | 2.5991E−04 | −1.7064E−05 |
| R10 | 6.1276E+00 | −8.7444E−03 | −9.2532E−04 | 7.9874E−04 | −3.9218E−04 | 8.5660E−05 | −8.5218E−06 |

TABLE 8

| | Conic coefficient | Aspheric coefficient | | | | | |
|---|---|---|---|---|---|---|---|
| | k | A4 | A6 | A8 | A10 | A12 | A14 |
| R1 | 0.0000E+00 | −2.3007E−05 | 7.0614E−06 | −4.7619E−07 | 0.0000E+00 | 0.0000E+00 | 0.0000E+00 |
| R2 | 0.0000E+00 | −6.4283E−05 | 5.6494E−05 | −8.2921E−06 | 0.0000E+00 | 0.0000E+00 | 0.0000E+00 |
| R3 | −1.0862E+01 | 7.1680E−03 | −8.9927E−03 | 3.1817E−03 | −5.0425E−04 | 2.8910E−05 | 0.0000E+00 |
| R4 | 0.0000E+00 | 4.4715E−02 | −2.1906E−02 | 4.3028E−03 | −8.1889E−05 | −6.1647E−05 | 3.8884E−06 |
| R5 | 0.0000E+00 | 1.2997E−02 | −2.6397E−03 | −3.1795E−03 | 1.4390E−03 | −1.8965E−04 | 6.2731E−06 |
| R6 | 0.0000E+00 | −5.0769E−03 | 7.5690E−03 | −7.3717E−03 | 2.7639E−03 | −4.6618E−04 | 3.1374E−05 |
| R7 | 0.0000E+00 | 2.8080E−03 | 6.9540E−03 | −8.1730E−03 | 3.7420E−03 | −8.0178E−04 | 6.6348E−05 |
| R8 | −1.7135E+00 | 1.6467E−02 | −1.1647E−02 | 5.1830E−03 | −1.1326E−03 | 9.9078E−05 | −1.3234E−06 |
| R9 | 5.1028E+00 | 4.7754E−03 | −1.5056E−02 | 8.0189E−03 | −2.3495E−03 | 3.4630E−04 | −2.1030E−05 |
| R10 | 5.3531E+00 | −1.1425E−02 | −5.7153E−04 | 6.7000E−04 | −3.2326E−04 | 6.4624E−05 | −5.6272E−06 |

TABLE 9

| 2ω (°) | 18.00 |
|---|---|
| Fno | 2.50 |
| f (mm) | 16.533 |
| f1 (mm) | 10.057 |
| f2 (mm) | −6.631 |
| f3 (mm) | 21.114 |
| f4 (mm) | 43.223 |
| f5 (mm) | 77.039 |
| TTL (mm) | 21.152 |
| LB (mm) | 9.601 |
| IH (mm) | 2.619 |

As shown in Table 16, Embodiment 3 satisfies the relational expressions (1) to (6).

Figure 11:
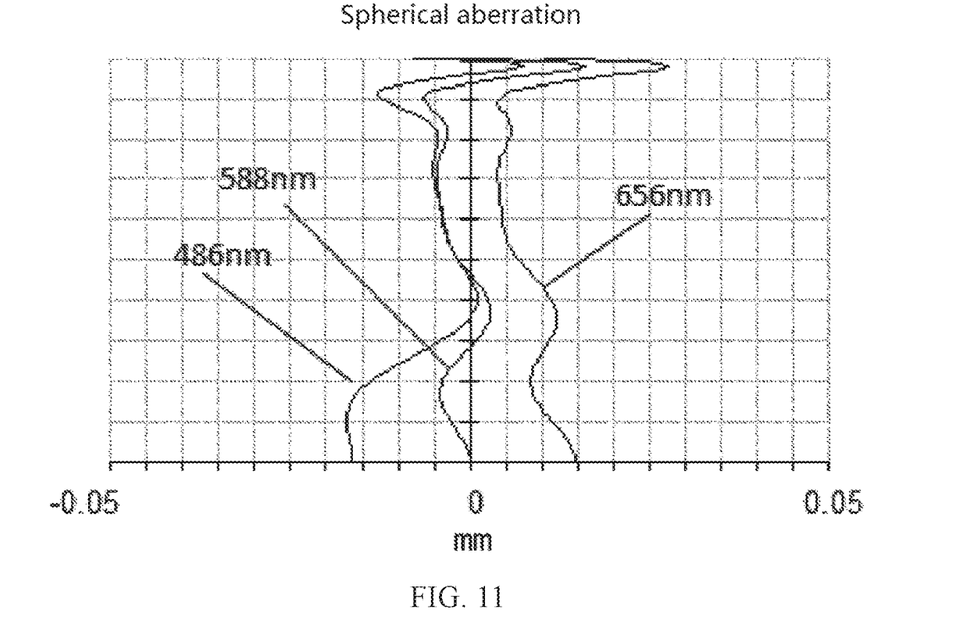
FIG. 11 is a diagram of a spherical aberration of the camera lens LA of Embodiment 3.
Figure 12:
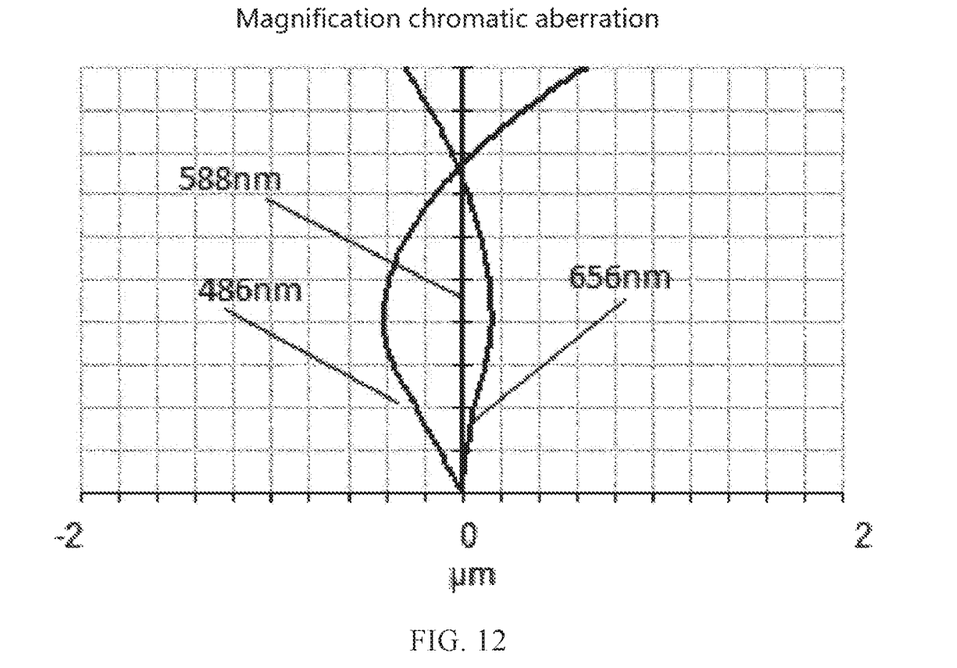
FIG. 12 is a diagram of a magnification chromatic aberration of the camera lens LA of Embodiment 3.
Figure 13:
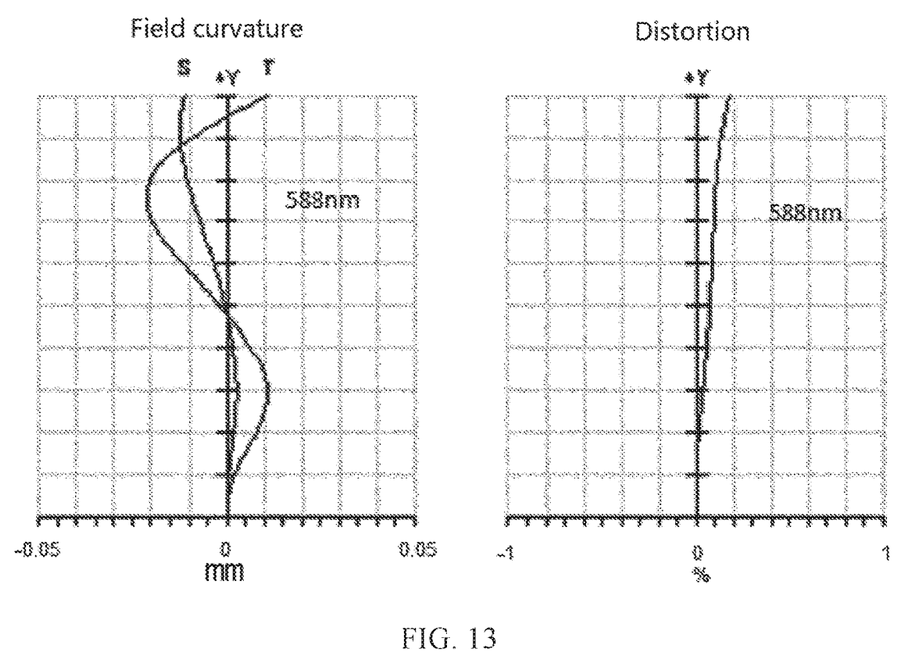
FIG. 13 is a diagram of field curvature and distortion of the camera lens LA of Embodiment 3.

The spherical aberration of the camera lens LA of Embodiment 3 is as shown in FIG. 11, the magnification chromatic aberration of magnification thereof is as shown in FIG. 12, and the field curvature and the distortion are as shown in FIG. 13. As shown in Table 9, the camera lens LA of Embodiment 3 has a narrow angle. As can be seen from FIGS. 11 to 13, the camera lens LA of Embodiment 3 has good optical properties.

Embodiment 4

Figure 14:
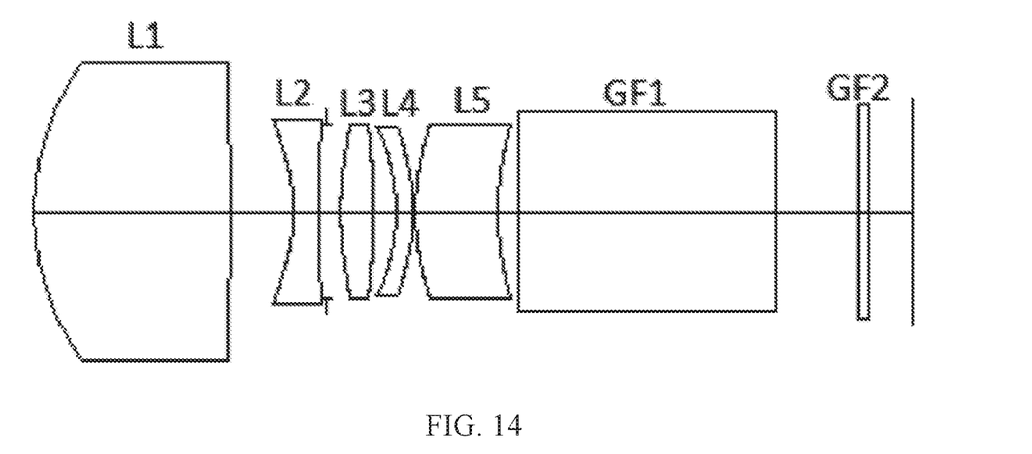
FIG. 14 is a structural diagram of the above-described camera lens LA according to Embodiment 4.

FIG. 14 is a structural diagram of the camera lens LA of Embodiment 4. Each of the first lens L1 to the fifth lens L5 constituting the camera lens LA of Embodiment 4 has a curvature radius R of the object side and image side, a center thickness of the lens or a distance d between the lenses, a refractive index nd and an Abbe number vd as shown in Table 10, a conic coefficient k and an aspheric coefficient as shown in Table 11, and 2ω, Fno, f, f1, f2, f3, f4, f5, TTL and IH as shown in Table 12.

TABLE 10

| | R (mm) | d (mm) | nd | vd | Effective Radius (mm) |
|---|---|---|---|---|---|
| R1 | 5.9634 | d1 4.600 | nd1 1.5439 | v1 55.95 | 3.492 |
| R2 | −35.2721 | d2 1.487 | | | 2.664 |
| R3 | −3.0679 | d3 0.557 | nd2 1.6606 | v2 20.40 | 2.145 |
| R4 | −27.8900 | d4 0.179 | | | 2.052 |
| STOP | ∞ | 0.351 | | | 2.015 |
| R5 | 9.1298 | d5 0.755 | nd3 1.6606 | v3 20.40 | 2.065 |
| R6 | −44.2634 | d6 0.549 | | | 2.012 |
| R7 | −4.3992 | d7 0.399 | nd4 1.6150 | v4 25.92 | 1.981 |
| R8 | −4.2435 | d8 0.050 | | | 1.991 |
| R9 | 5.6357 | d9 1.929 | nd5 1.5439 | v5 55.95 | 2.031 |
| R10 | 5.8279 | d10 0.500 | | | 2.005 |
| R11 | ∞ | d11 6.000 | nd6 1.7725 | v6 49.60 | 2.026 |
| R12 | ∞ | d12 1.964 | | | 2.348 |
| R13 | ∞ | d13 0.210 | nd7 1.5168 | v7 64.17 | 2.536 |
| R14 | ∞ | d14 1.050 | | | 2.549 |

TABLE 11

| | Conic coefficient | Aspheric coefficient | | | | | |
|---|---|---|---|---|---|---|---|
| | k | A4 | A6 | A8 | A10 | A12 | A14 |
| R1 | 0.0000E+00 | −3.9317E−05 | 3.1747E−06 | −4.2960E−07 | 0.0000E+00 | 0.0000E+00 | 0.0000E+00 |
| R2 | 0.0000E+00 | 9.2222E−04 | −1.1761E−04 | 3.1744E−06 | 0.0000E+00 | 0.0000E+00 | 0.0000E+00 |
| R3 | −1.0859E+01 | 2.3729E−03 | −3.8598E−03 | 1.0791E−03 | −1.2446E−04 | 4.7457E−05 | 0.0000E+00 |
| R4 | 0.0000E+00 | 4.6614E−02 | −2.4695E−02 | 7.1474E−03 | −1.3064E−03 | 1.5999E−04 | −1.0112E−05 |
| R5 | 0.0000E+00 | 1.3555E−02 | −5.0604E−03 | −1.2912E−03 | 6.2364E−04 | −3.4468E−05 | −3.2320E−06 |
| R6 | 0.0000E+00 | −2.7598E−03 | 8.2922E−03 | −8.6939E−03 | 3.1651E−03 | −5.0630E−04 | 3.2676E−05 |
| R7 | 0.0000E+00 | −9.8487E−04 | 1.3209E−02 | −1.2364E−02 | 5.2167E−03 | −1.0819E−03 | 8.7987E−05 |
| R8 | −1.9155E+00 | 1.6941E−02 | −1.1170E−02 | 5.0192E−03 | −1.0912E−03 | 7.1087E−05 | 3.5048E−06 |
| R9 | 5.3947E+00 | 5.8242E−03 | −1.8439E−02 | 1.1069E−02 | −3.6454E−03 | 6.1469E−04 | −4.2859E−05 |
| R10 | 5.8437E+00 | −8.8864E−03 | −1.8093E−03 | 1.4711E−03 | −6.4484E−04 | 1.3410E−04 | −1.2036E−05 |

TABLE 12

| | |
|---|---|
| 2ω (°) | 17.99 |
| Fno | 2.50 |
| f (mm) | 16.478 |
| f1 (mm) | 9.762 |
| f2 (mm) | −5.266 |
| f3 (mm) | 11.523 |
| f4 (mm) | 98.677 |
| f5 (mm) | 69.275 |
| TTL (mm) | 20.580 |
| LB (mm) | 9.724 |
| IH (mm) | 2.619 |

As shown in Table 16, Embodiment 4 satisfies the relational expressions (1) to (6).

Figure 15:
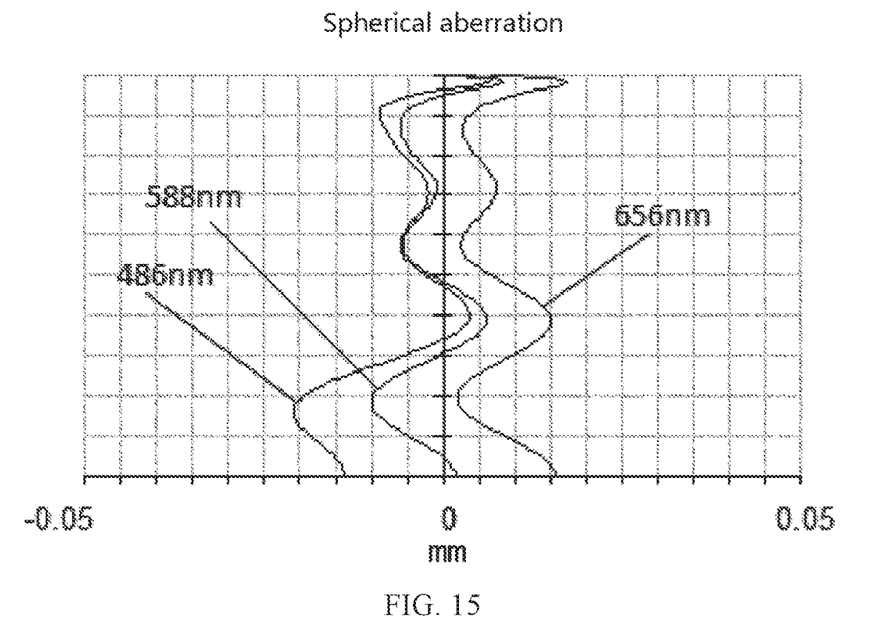
FIG. 15 is a diagram of a spherical aberration of the camera lens LA of Embodiment 4.
Figure 16:
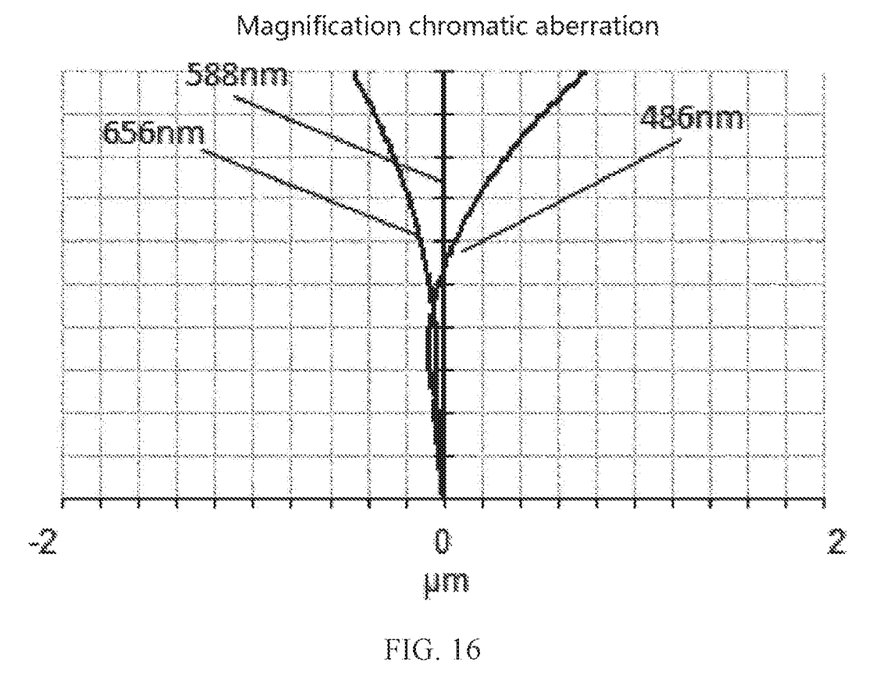
FIG. 16 is a diagram of a magnification chromatic aberration of the camera lens LA of Embodiment 4.
Figure 17:
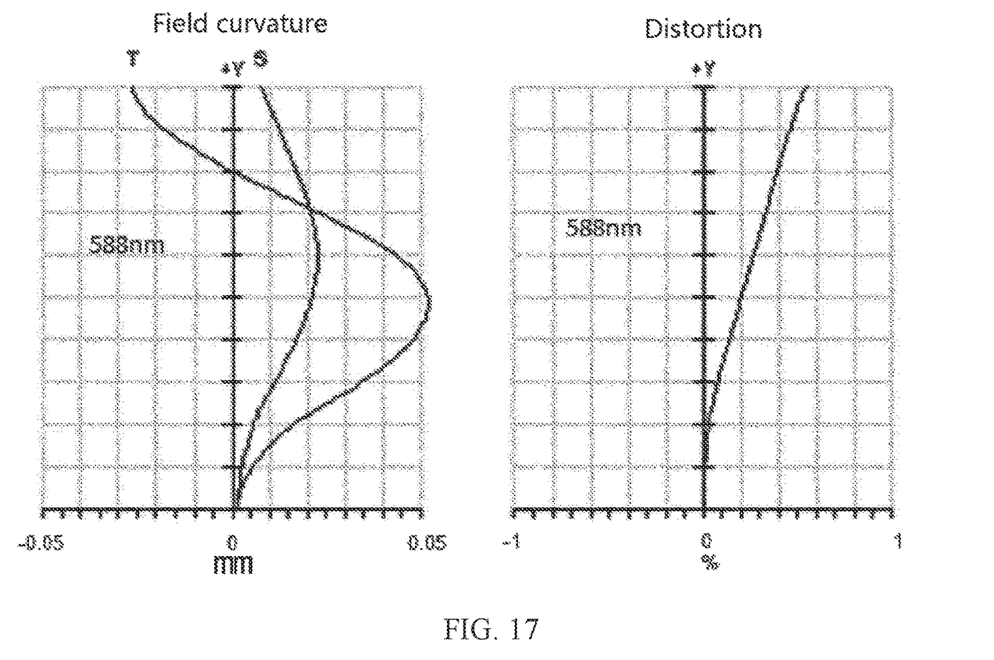
FIG. 17 is a diagram of field curvature and distortion of the camera lens LA of Embodiment 4.

The spherical aberration of the camera lens LA of Embodiment 4 is as shown in FIG. 15, the magnification chromatic aberration of magnification thereof is as shown in FIG. 16, and the field curvature and the distortion are as shown in FIG. 17. As shown in Table 12, the camera lens LA of Embodiment 4 has a narrow angle. As can be seen from FIGS. 15 to 17 the camera lens LA of Embodiment 4 has good optical properties.

Embodiment 5

Figure 18:
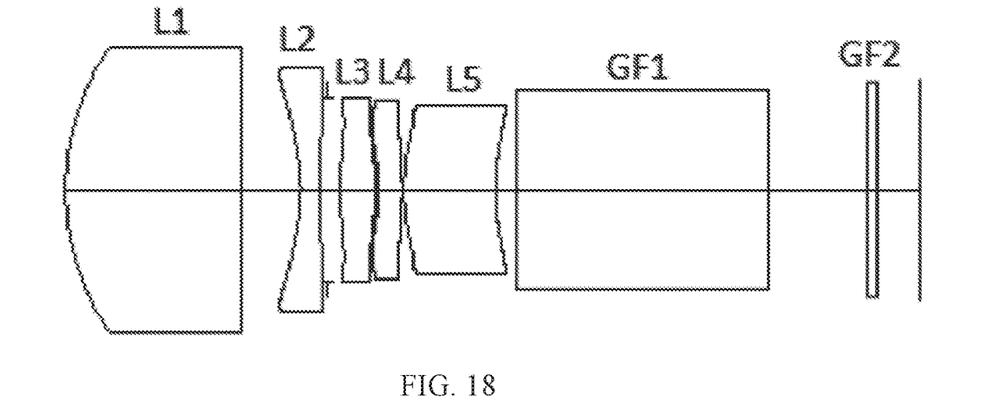
FIG. 18 is a structural diagram of the above-described camera lens LA according to Embodiment 5.

FIG. 18 is a structural diagram of the camera lens LA of Embodiment 5. Each of the first lens L1 to the fifth lens L5 constituting the camera lens LA of Embodiment 5 has a curvature radius R of the object side and image side, a center thickness of the lens or a distance d between the lenses, a refractive index nd and an Abbe number vd as shown in Table 13, a conic coefficient k and an aspheric coefficient as shown in Table 14, and 2ω, Fno, f, f1, f2, f3, f4, f5, TTL and IH as shown in Table 15.

TABLE 13

| | R (mm) | d (mm) | nd | vd | Effective Radius (mm) |
|---|---|---|---|---|---|
| R1 | 6.1007 | d1 4.195 | nd1 1.5439 | v1 55.95 | 3.400 |
| R2 | −33.8926 | d2 1.398 | | | 3.410 |
| R3 | −3.6264 | d3 0.449 | nd2 1.6606 | v2 20.40 | 2.928 |
| R4 | −22.9725 | d4 0.167 | | | 2.371 |
| STOP | ∞ | 0.328 | | | 2.169 |
| R5 | 26.8288 | d5 0.803 | nd3 1.6606 | v3 20.40 | 2.170 |
| R6 | −205.5056 | d6 0.080 | | | 2.140 |
| R7 | −15.0717 | d7 0.573 | nd4 1.6150 | v4 25.92 | 2.151 |
| R8 | −9.2912 | d8 0.050 | | | 2.101 |
| R9 | 4.8621 | d9 2.177 | nd5 1.5439 | v5 55.95 | 2.039 |
| R10 | 5.3424 | d10 0.500 | | | 2.034 |
| R11 | ∞ | d11 6.000 | nd6 1.7725 | v6 49.60 | 2.053 |
| R12 | ∞ | d12 2.345 | | | 2.345 |
| R13 | ∞ | d13 0.210 | nd7 1.5168 | v7 64.17 | 2.548 |
| R14 | ∞ | d14 1.050 | | | 2.560 |

TABLE 14

| | Conic coefficient | Aspheric coefficient | | | | | |
|---|---|---|---|---|---|---|---|
| | k | A4 | A6 | A8 | A10 | A12 | A14 |
| R1 | 0.0000E+00 | 2.1257E−05 | 1.5340E−07 | 6.5263E−08 | 0.0000E+00 | 0.0000E+00 | 0.0000E+00 |
| R2 | 0.0000E+00 | 2.0735E−03 | −5.2894E−05 | −1.6288E−06 | 0.0000E+00 | 0.0000E+00 | 0.0000E+00 |
| R3 | −1.6926E+01 | 5.9618E−03 | −3.2002E−03 | 8.0629E−04 | −1.1644E−04 | 6.8799E−06 | 0.0000E+00 |
| R4 | 0.0000E+00 | 5.5380E−02 | −2.7003E−02 | 7.2189E−03 | −1.2148E−03 | 1.1496E−04 | −4.4200E−06 |
| R5 | 0.0000E+00 | 3.0028E−02 | −6.6986E−03 | −5.2680E−03 | 2.3254E−03 | −3.3998E−04 | 1.7868E−05 |
| R6 | 0.0000E+00 | −9.4896E−02 | 9.0683E−02 | −4.4054E−02 | 1.1527E−02 | −1.5305E−03 | 8.2136E−05 |
| R7 | 0.0000E+00 | −1.3929E−01 | 1.3906E−01 | −6.1912E−02 | 1.5302E−02 | −2.0008E−03 | 1.0726E−04 |
| R8 | −1.8021E+01 | −2.1278E−02 | 4.0450E−02 | −2.1600E−02 | 5.7000E−03 | −7.7619E−04 | 4.3111E−05 |
| R9 | 2.3095E+00 | −7.6939E−03 | 4.3371E−03 | −6.0627E−03 | 2.2438E−03 | −3.7462E−04 | 2.4178E−05 |
| R10 | 3.7177E+00 | −9.6949E−03 | −1.2892E−03 | 4.6252E−04 | −1.1278E−04 | 1.3143E−05 | −8.9383E−07 |

TABLE 15

| | |
|---|---|
| 2ω (°) | 18.00 |
| Fno | 2.50 |
| f (mm) | 16.432 |
| f1 (mm) | 9.870 |
| f2 (mm) | −6.580 |
| f3 (mm) | 35.739 |
| f4 (mm) | 37.959 |
| f5 (mm) | 38.295 |
| TTL (mm) | 20.326 |
| LB (mm) | 10.105 |
| IH (mm) | 2.619 |

As shown in Table 16, Embodiment 5 satisfies the relational expressions (1) to (6).

Figure 19:
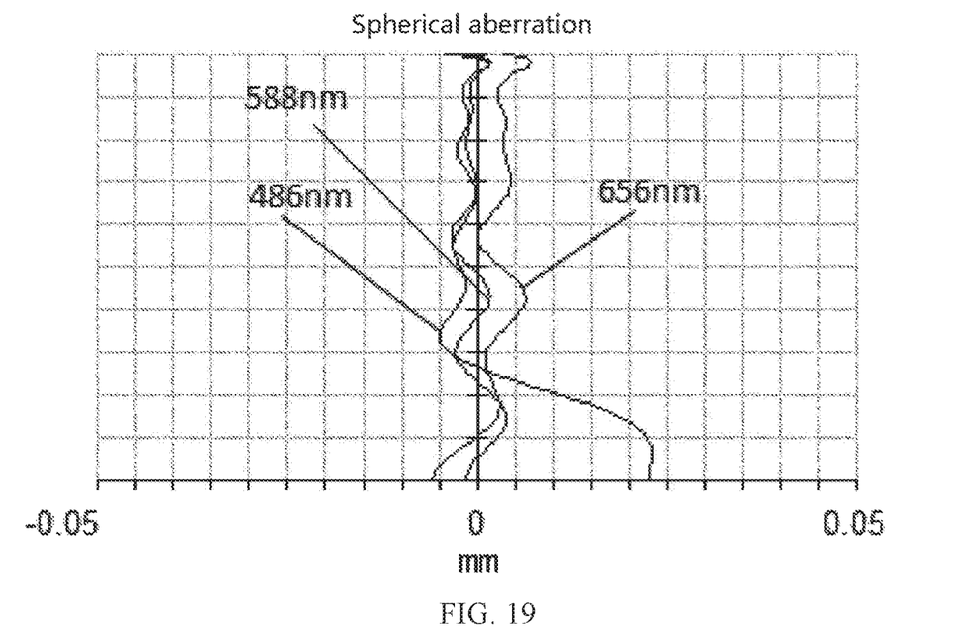
FIG. 19 is a diagram of a spherical aberration of the camera lens LA of Embodiment 5.
Figure 20:
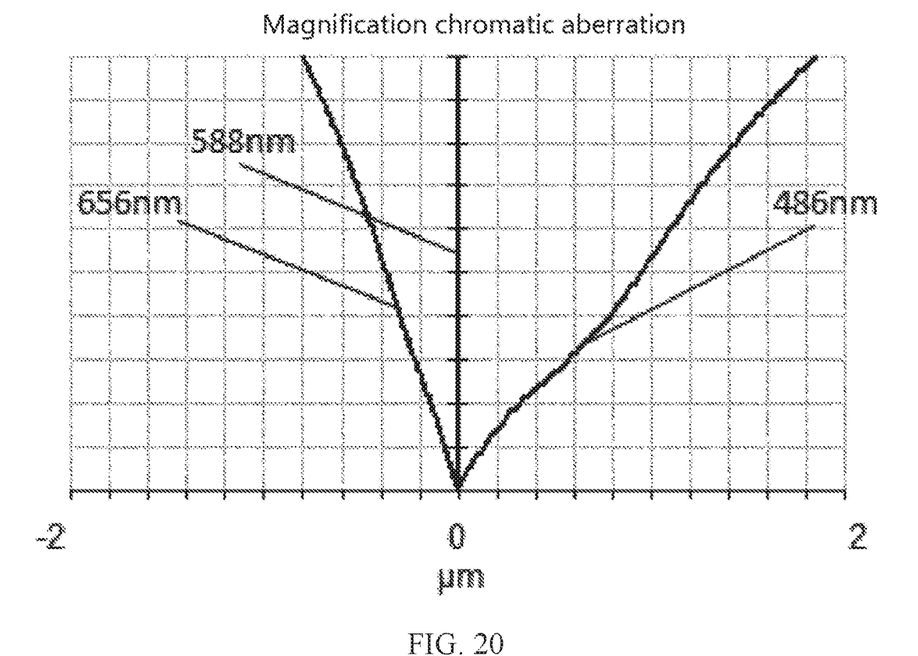
FIG. 20 is a diagram of a magnification chromatic aberration of the camera lens LA of Embodiment 5.
Figure 21:
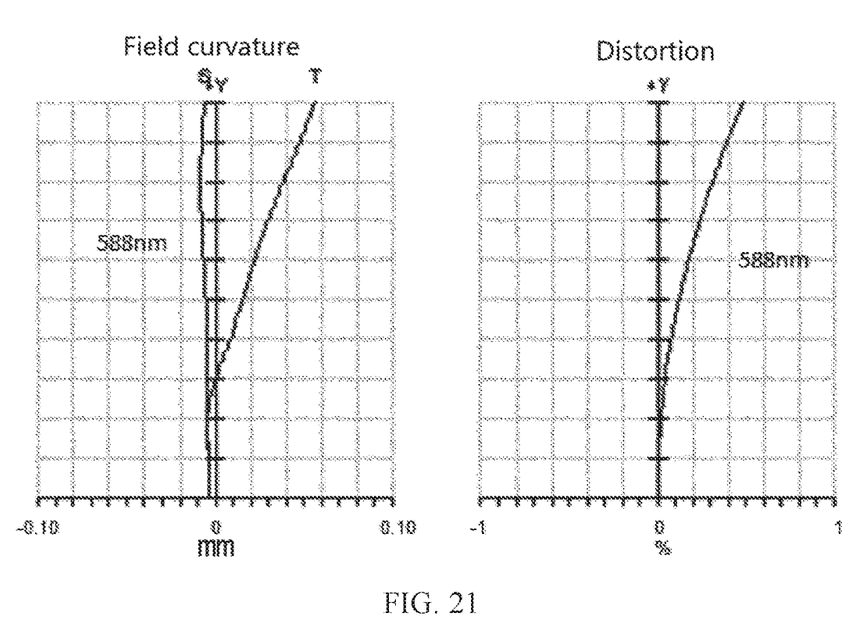
FIG. 21 is a diagram of field curvature and distortion of the camera lens LA of Embodiment 5.

The spherical aberration of the camera lens LA of Embodiment 1 is as shown in FIG. 19, the magnification chromatic aberration of magnification thereof is as shown in FIG. 20, and the field curvature and the distortion are as shown in FIG. 21. As shown in Table 15, the camera lens LA of Embodiment 5 has a narrow angle. As can be seen from FIGS. 19 to 21, the camera lens LA of Embodiment 5 has good optical properties.

Table 16 shows the numerical values defined in Embodiments 1 to 5 and the numerical values corresponding to the parameters specified by the relational expressions (1) to (6).

TABLE 16

|       | Embodiment 1 | Embodiment 2 | Embodiment 3 | Embodiment 4 | Embodiment 5 |        |
|-------|--------------|--------------|--------------|--------------|--------------|--------|
| d1/f  | 0.255        | 0.280        | 0.275        | 0.279        | 0.255        | Exp(1) |
| d3/f  | 0.037        | 0.030        | 0.017        | 0.034        | 0.027        | Exp(2) |
| f1/f2 | −1.500       | −1.530       | −1.517       | −1.854       | −1.500       | Exp(3) |
| R1/R2 | −0.180       | −0.103       | −0.122       | −0.169       | −0.180       | Exp(4) |
| R3/R4 | 0.186        | 0.183        | 0.188        | 0.110        | 0.158        | Exp(5) |
| R5/R6 | −0.130       | −0.340       | −0.336       | −0.206       | −0.130       | Exp(6) |

LIST OF REFERENCE NUMBERS

LA: camera lens
STOP: open aperture
L1: the first lens
L2: the second lens
L3: the third lens
L4: the fourth lens
L5: the fifth lens
GF1: glass plate 1
GF2: glass plate 2
R: the curvature radius of the optical surface, which is the center curvature radius of the lens
R1: the curvature radius of the object side surface of the first lens L1
R2: a curvature radius of the image side surface of the first lens L1
R3: a curvature radius of the object side surface of the second lens L2
R4: a curvature radius of the image side surface of the second lens L2
R5: a curvature radius of the object side surface of the third lens L3
R6: a curvature radius of the image side surface of the third lens L3
R7: a curvature radius of the object side surface of the fourth lens L4
R8: a curvature radius of the image side surface of the fourth lens L4
R9: a curvature radius of the object side surface of the fifth lens L5
R10: a curvature radius of the image side surface of the fifth lens L5
R11: a curvature radius of the object side surface of the glass plate GF1
R12: a curvature radius of the image side surface of the glass plate GF1
R13: a curvature radius of the object side surface of the glass plate GF2
R14: a curvature radius of the image side surface of the glass plate GF2
d: the center thickness of the lens or the distance between the lenses
d1: the center thickness of the first lens L1
d2: the axial distance from the image side surface of the first lens L1 to the object side surface of the second lens L2
d3: the center thickness of the second lens L2
d4: the axial distance from the image side surface of the second lens L2 to the object side surface of the third lens L3
d5: the center thickness of the third lens L3
d6: the axial distance from the image side surface of the third lens L3 to the object side surface of the fourth lens L4
d7: the center thickness of the fourth lens L4
d8: the axial distance from the image side surface of the fourth lens L4 to the object side surface of the fifth lens L5
d9: the center thickness of the fifth lens L5
d10: the axial distance from the image side surface of the fifth lens L5 to the object side surface of the glass plate GF1;
d1: the center thickness of the glass plate GF1;
d12: the axial distance from the image side surface of the glass plate GF1 to the object side surface of the glass plate GF12;
d13: the center thickness of the glass plate GF12;
d14: the axial distance from the image side surface of the glass plate GF2 to the imaging plane;
nd: the refractive index of line d;
nd1: the refractive index of line d of the first lens L1;
nd2: the refractive index of line d of the second lens L2;
nd3: the refractive index of line d of the third lens L3;
nd4: the refractive index of line d of the fourth lens L4;
nd5: the refractive index of line d of the fifth lens L5;
nd6: the refractive index of line d of the glass plate GF1;
nd7: the refractive index of line d of the glass plate GF2;
ν: the Abbe number;
ν1: the Abbe number of the first lens L1;
ν2: the Abbe number of the second lens L2;
ν3: the Abbe number of the third lens L3;
ν4: the Abbe number of the fourth lens L4;
ν5: the Abbe number of the fifth lens L5;
ν6: the Abbe number of the glass plate GF1;
ν7: the Abbe number of the glass plate GF2.

What is claimed is:

1. A camera lens, comprising, from an object side:
a first lens having a positive refractive power;
a second lens having a negative refractive power;
a third lens having a positive refractive power;
a fourth lens having a positive refractive power; and
a fifth lens having a positive refractive power,
wherein the camera lens satisfies the following relational expressions (1) to (2):

$$0.25 \leq d1/f \leq 0.30 \tag{1};$$

$$0.01 \leq d3/f \leq 0.04 \tag{2}, \text{ and}$$

wherein
f denotes an overall focal length of the camera lens,
d1 denotes a center thickness of the first lens, and
d3 denotes a center thickness of the second lens.

2. The camera lens as described in claim 1, wherein:
the camera lens satisfies the following relational expression (3):

$$-2.00 \leq f1/f2 \leq -1.45 \tag{3},$$

wherein
f1 denotes a focal length of the first lens; and
f2 denotes a focal length of the second lens.

3. The camera lens as described in claim 1, wherein:
the camera lens satisfies the following relational expression (4):

$$-0.20 \leq R1/R2 \leq -0.08 \quad (4),$$

wherein

R1 is a curvature radius of an object side surface of the first lens; and

R2 is a curvature radius of an image side surface of the first lens.

4. The camera lens as described in claim 1, wherein:
the camera lens satisfies the following relational expression (5):

$$0.10 \leq R3/R4 \leq 0.25 \quad (5),$$

wherein

R3 is a curvature radius of an object side surface of the second lens; and

R4 is a curvature radius of an image side surface of the second lens.

5. The camera lens as described in claim 1, wherein:
the camera lens satisfies the following relational expression (6):

$$-0.35 \leq R5/R6 \leq -0.05 \quad (6),$$

wherein

R5 is a curvature radius of an object side surface of the third lens; and

R6 is a curvature radius of an image side surface of the third lens.

* * * * *